C. A. T. SÖRENSEN.
BALL RETAINER FOR THRUST BEARINGS.
APPLICATION FILED AUG. 14, 1914.

1,169,880.

Patented Feb. 1, 1916.

Witnesses:

Inventor:
Carl August Theodor Sorensen
By Attorneys,
Fraser, Turk & Myers

UNITED STATES PATENT OFFICE.

CARL AUGUST THEODOR SÖRENSEN, OF GOTTENBORG, SWEDEN, ASSIGNOR TO AKTIE-BOLAGET SVENSKA KULLAGERFABRIKEN, OF GOTTENBORG, SWEDEN, A CORPORATION OF SWEDEN.

BALL-RETAINER FOR THRUST-BEARINGS.

1,169,880.  Specification of Letters Patent.  Patented Feb. 1, 1916.

Application filed August 14, 1914. Serial No. 856,749.

*To all whom it may concern:*

Be it known that I, CARL AUGUST THEODOR SÖRENSEN, a citizen of the Kingdom of Sweden, residing at Gottenborg, Sweden, have invented new and useful Improvements in Ball-Retainers for Thrust-Bearings, of which the following is a specification.

This invention relates to ball retainers for thrust ball bearings of the kind which consists of a member keeping the balls apart, and a ring surrounding and forming an outer support for the balls.

It has already been proposed to reduce the friction between the ball retainer and the balls by making the ring which supports the balls rotatable in relation to the part of the ball retainer keeping the balls apart. In such devices there is however no means provided for keeping the parts of the ball retainer centered relatively to each other which, under unfavorable circumstances, can cause the balls to press strongly against the part of the ball retainer keeping the balls apart resulting in wear and tear as well as seizing of the parts.

This invention has for its object to prevent the said drawbacks and consists, chiefly, in this that both main parts of the ball retainer are kept centered in relation to each other by means of rolling members such as balls or rollers placed between said parts, so as to prevent lateral displacement of the parts of the ball-retainer relatively to each other but at the same time permit one of said parts to rotate in relation to the other with slight friction.

I attain these objects and advantages by means of the construction shown in the accompanying drawings in which—

Figure 1:
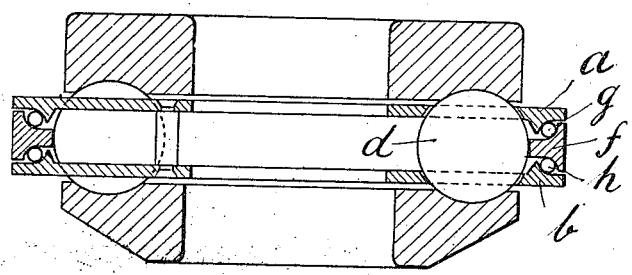
Figure 2:
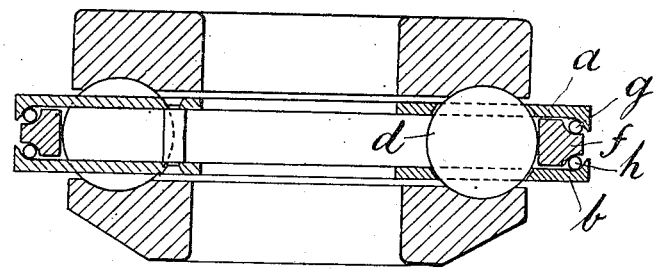
Figure 3:
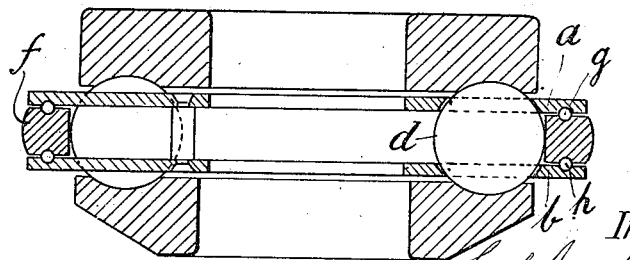

Figures 1 to 3 inclusive show sectional views of some ball retainers embodying my invention.

Referring to Fig. 1, the two plates $a$ and $b$ are secured to each other by means of bolts or the like and provided with apertures engaged by the balls so that the latter are kept apart in well-known manner. The outer ring $f$ forming an outer support for the balls is rotatable relatively to the plates $a$ and $b$. Placed between the ring $f$ and the plates $a$ and $b$ are two series of balls $g$ and $h$ by means of which the parts of the ball retainers are kept well centered relatively to each other, while at the same time said parts may rotate in relation to each other with slight friction. The points of engagement of the balls $g$ and $h$ are suitably located on each of two cones coaxial with the axis of the bearing, so that said balls are capable of sustaining axial as well as radial thrusts. The balls $g$ and $h$ need not necessarily be placed at the inner side of the ring $f$ but may, if desired, be placed at the outer side of said ring, as is shown in Fig. 2, or at the upper and lower sides thereof, as is shown in Fig. 3.

By the arrangement described above the advantage is obtained that the balls $d$ in outward direction bear against the member $f$ only and, consequently, at a single point (the pole of rotation). The balls $d$ bear, it is true, against the member $a$ in points lying on a circle, the center of which is located on the axis of the bearing, but the pressure in these points is considerably smaller than in the outward direction (*i. e.* in the direction of the centrifugal force) and on account thereof no friction detrimental to the bearing can arise at said points of engagement.

Having thus fully described my invention, what I claim is:—

1. A ball retainer for thrust ball bearings, consisting of two parts rotatably mounted in relation to each other, and rolling members between said parts for centering them in relation to each other.

2. A ball retainer for thrust ball bearings, consisting of two parts rotatably mounted in relation to each other, one of said parts forming a separator for the bearing balls and the other forming a support for said balls in radial direction, and rolling members centering said parts in relation to each other.

3. A ball retainer for thrust ball bearings, consisting of a ring-shaped part encircling the bearing balls, a ball retaining and separating part, and balls between said parts in such position as to allow a rotative movement of said parts in relation to each other and prevent relative radial displacement thereof.

In testimony whereof I have hereunto set my hand in presence of two subscribing witnesses.

CARL AUGUST THEODOR SÖRENSEN.

Witnesses:
K. E. WIBERG,
G. NORDSTRAND.

Copies of this patent may be obtained for five cents each, by addressing the "Commissioner of Patents, Washington, D. C."